US007898500B2

(12) United States Patent  (10) Patent No.: US 7,898,500 B2
Fuller et al.  (45) Date of Patent: Mar. 1, 2011

(54) AUXILIARY DISPLAY WITHIN A PRIMARY DISPLAY SYSTEM

(75) Inventors: Andrew J. Fuller, Redmond, WA (US); Matthew P. Rhoten, Kirkland, WA (US); Niels Van Dongen, Seattle, WA (US); Gregory H. Parks, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1318 days.

(21) Appl. No.: 11/438,407

(22) Filed: May 22, 2006

(65) Prior Publication Data

US 2007/0268200 A1  Nov. 22, 2007

(51) Int. Cl.
G06F 3/00 (2006.01)
G06F 15/16 (2006.01)
G06F 1/00 (2006.01)
G06F 1/32 (2006.01)
G06F 1/16 (2006.01)
G09G 5/00 (2006.01)
G06T 1/20 (2006.01)
G06F 17/00 (2006.01)

(52) U.S. Cl. .......... 345/1.1; 345/505; 345/502; 713/300; 713/320; 710/18; 710/51; 710/59; 361/679.21; 715/273; 715/873; 715/961

(58) Field of Classification Search .......... 345/501–503, 345/505–506, 519–520, 1.1, 502, 901–905; 713/300, 320, 323–324, 340, 375; 709/201; 361/679.21, 679.28–679.3; 710/1, 18, 51, 710/59, 60; 715/200, 273, 700, 867, 864, 715/961
See application file for complete search history.

(56) References Cited

U.S. PATENT DOCUMENTS

| 5,752,044 | A | 5/1998 | Crump et al. |
| 6,191,758 | B1 | 2/2001 | Lee |
| 6,670,950 | B1 | 12/2003 | Chin et al. |
| 7,152,171 | B2* | 12/2006 | Chandley et al. ............. 713/320 |
| 2003/0006942 | A1 | 1/2003 | Searls et al. |
| 2003/0198008 | A1 | 10/2003 | Leapman et al. |
| 2004/0148531 | A1 | 7/2004 | Yamazaki et al. |
| 2004/0183747 | A1* | 9/2004 | Bowen ........................ 345/1.1 |
| 2004/0225901 | A1* | 11/2004 | Bear et al. ................... 713/300 |

(Continued)

FOREIGN PATENT DOCUMENTS

EP  0636964 B1  9/2002

(Continued)

OTHER PUBLICATIONS

International Search Report dated Sep. 14, 2007 for Application No. PCT/US2007/010871, 7 pages.

(Continued)

Primary Examiner — Wesner Sajous

(57) ABSTRACT

An auxiliary processing state of a computing device provides an auxiliary display within a primary display device of the computing device. As such, a computing device can switch from a primary processing state (e.g., full power, full operating system, full functionality) to an auxiliary processing state and yet still provide a user interface through the primary display device. The auxiliary processing state may employ a different processor than the primary processing state. Alternatively, auxiliary processing state and the primary processing state may employ different processing modes of the same processor. Transitions between the auxiliary display of the auxiliary processing state and the primary display of the primary processing state may be transitioned to preserve some consistency between the two displays.

19 Claims, 9 Drawing Sheets

U.S. PATENT DOCUMENTS

| | | |
|---|---|---|
| 2005/0049006 A1 | 3/2005 | Lee |
| 2005/0066209 A1 | 3/2005 | Kee et al. |
| 2005/0243019 A1* | 11/2005 | Fuller et al. .................. 345/1.3 |
| 2005/0243020 A1 | 11/2005 | Steeb et al. |
| 2005/0243021 A1 | 11/2005 | Perez et al. |
| 2005/0246563 A1 | 11/2005 | Chandley et al. |
| 2006/0007051 A1 | 1/2006 | Bear et al. |
| 2006/0170613 A1* | 8/2006 | Vong et al. .................... 345/1.2 |
| 2006/0232494 A1* | 10/2006 | Lund et al. .................... 345/1.1 |
| 2006/0282327 A1* | 12/2006 | Neal et al. ....................... 705/14 |
| 2007/0067658 A1* | 3/2007 | Chandley et al. ............ 713/320 |
| 2007/0236407 A1* | 10/2007 | Toorians ........................ 345/1.1 |
| 2010/0066642 A1* | 3/2010 | Fuller et al. .................. 345/1.1 |

FOREIGN PATENT DOCUMENTS

| | | |
|---|---|---|
| KR | 10-20020024629 A | 9/2006 |
| WO | WO-2005119404 A1 | 12/2005 |

OTHER PUBLICATIONS

Captain, "Auxiliary Displays / LID", Nov. 8, 2004, http://www.handtops.com/show/news/66/0/Auxiliary_Displays_LID.html.

Joris Evers, "Check laptop email without booting-up", Feb. 10, 2005, http://www.techworld.com/mobility/news/index.cfm?NewsID=3111.

* cited by examiner

AUXILIARY DISPLAY WITHIN A PRIMARY DISPLAY SYSTEM

BACKGROUND

Most existing computing devices must be booted and made substantially operational in order to provide helpful information and functionality. For example, if a user is carrying around his or her laptop computer from meeting to meeting, it might be helpful to reference a calendar program on the computer to determine the proper time and location for the next meeting. However, to access the calendar program, the computer user must keep the computer running or repeatedly boot and shutdown (or wake up and suspend) the computer during this time. Unfortunately, the former presents concerns about battery usage, heat, and damage to the computer from jostling and bumping during operation, and the latter presents an inconvenience so significant that it may discourage the user from accessing the computer at all for this purpose.

To address this problem, computer designers have provided auxiliary display devices that supplement the primary display devices of certain systems. For example, in some existing laptop computers with a clam-shell-type design (in which the primary display device is positioned on the "interior" side of a panel that closes against the computer's keyboard), an auxiliary display device is positioned in the opposite ("exterior") side of the panel, so as to allow auxiliary access to certain computer information and functionality when the laptop computer's lid is closed. In another example, the auxiliary display device is attached externally to the computing device, such as by being fastened to the lid of a laptop computer by a mounting clip. In another approach, a mobile phone, a Bluetooth display device, or other display device is communicatively coupled to the computing device to provide auxiliary display capabilities. However, these design approaches add nontrivial costs and size/space requirements to computing device designs that are continuously pressured to provide a lower cost and a thinner/lighter system.

SUMMARY

Implementations described and claimed herein address the foregoing problems by providing an auxiliary processing state of a computing device that provides an auxiliary display within a primary display device of the computing device. As such, a computing device can switch from a primary processing state (e.g., having one or more of full power, full operating system, full functionality, etc.) to an auxiliary processing state (e.g., having one or more of lower power, limited operating system, limited functionality, etc.) and yet still provide a user interface through the primary display device. The auxiliary processing state may be provided by a different processor than the primary processing state. Alternatively, auxiliary processing state and the primary processing state may employ different processing modes of the same processor. Transitions between the auxiliary display of the auxiliary processing state and the primary display of the primary processing state may be transitioned to preserve some consistency between the two displays.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTIONS

An auxiliary display provides a user interface in an auxiliary processing state of a computing device to allow a user some alternative access to his or her computing resources without requiring a full activation of the primary processing state. For example, a user may carry around a tablet computer from meeting to meeting and need to access his or her calendar data that is stored on the tablet computer. Rather than booting the tablet computer or fully reactivating the tablet computer out of a standby or hibernation mode, the user can merely activate an auxiliary display within an auxiliary processing state to access an auxiliary calendar application. Typically, the auxiliary processing state is characterized by lower power consumption and a limited user interface, although different auxiliary characteristics may be employed in various implementations.

Within an auxiliary processing state, example auxiliary applications can provide access to certain data and functionality. Example auxiliary applications may include without limitation calendar applications, email alert applications, mapping applications, task applications, etc. Example data and functionality may include without limitation appointment reminders, email notifications, voicemail notifications, calendar data, system status notifications, mapping data, Web-accessed data, multimedia data, etc. Such auxiliary applications may also combine visual data through the auxiliary display with audible signals, such as beeps, voice recordings, sound effects, and multimedia sound tracks. For example, the auxiliary processing state may detect an appointment reminder via an auxiliary calendar application, display a visual appointment reminder in the auxiliary display, and beep to audibly attract the user's attention to the auxiliary display.

Figure 1:
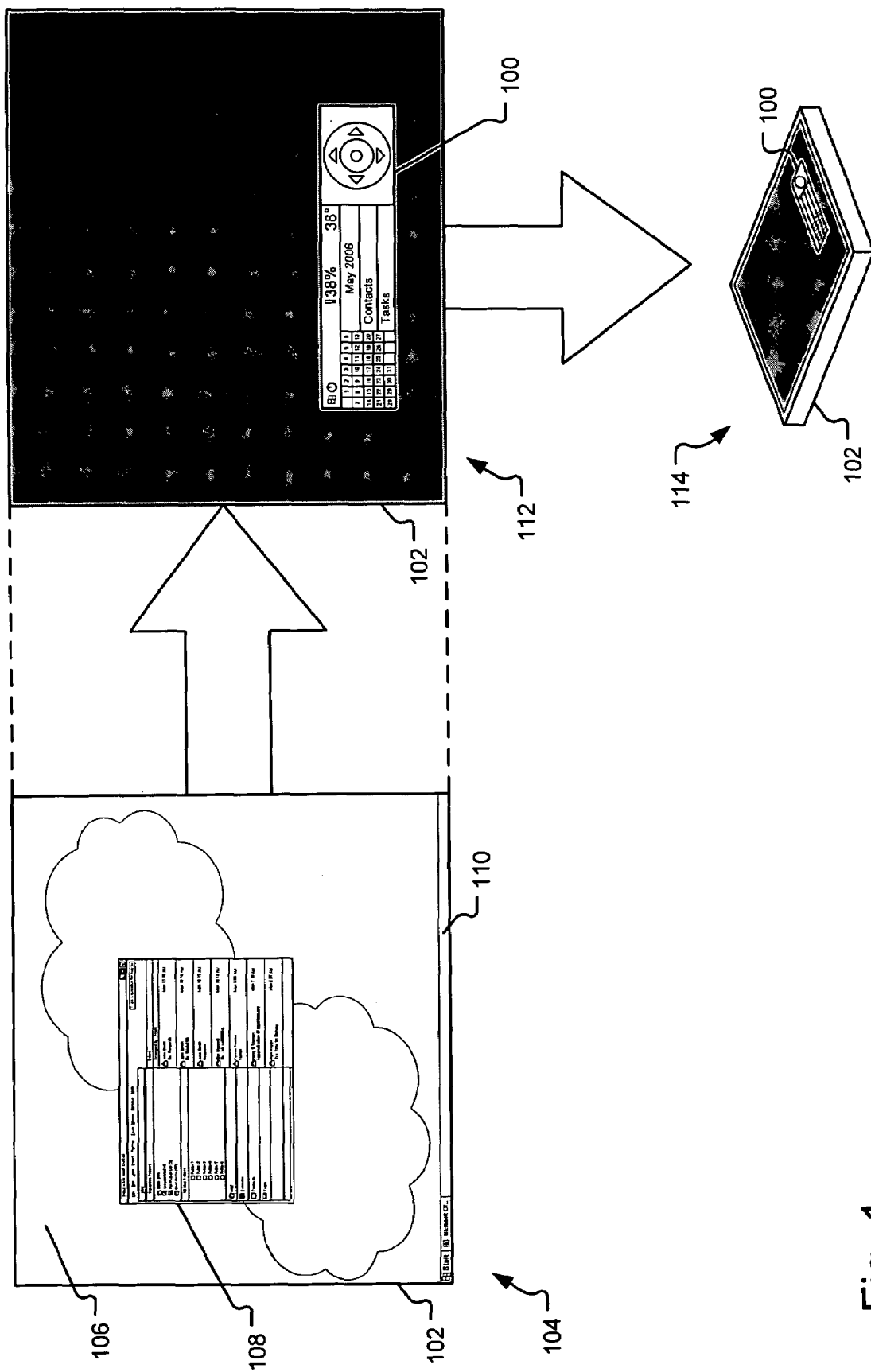
FIG. 1 illustrates an example auxiliary display provided within a primary display device.

FIG. 1 illustrates an example auxiliary display 100 provided within a primary display device 102. The primary display device 102 may be in the form of any number of display types, including without limitation, an active matrix display, a backlight display, a monochrome display, a color display, a flat panel display, etc., or any combination thereof.

In the left portion of FIG. 1, the primary display device 102 presents an example primary display 104, including an operating system desktop 106, an application window 108, and a task bar 110. The primary display 104 is presented under control of the operating system and a primary processor and represents a user's typical computing experience in which he or she might answer emails, perform word processing, execute selected applications, etc. It should be understood that the primary display 104 may be implemented using a variety of operating systems environments, user interface features, and processors.

In one scenario, user may operate in the primary processing state for a period of time and then decide to put the computing device into a standby or hibernation mode, for example, in order to move to a different location. It should be understood that suspension and hibernation events may also be automatically triggered by policy or configuration (e.g., standby after 10 minutes of no user interaction). Typically, standby and hibernation modes secure data and application threads and shut down the primary processor (or switch the primary processor into a low power consumption mode) to switch the computing device into an auxiliary processing state. For example, the auxiliary processing state may do one or more of the following: suspend multiple processing threads, spin down the hard drive, turn off the primary display device, turn off the system fan, turn off the touch screen capabilities, turn off a WiFi transceiver, reduce power consumption, etc. However, the auxiliary processing state can nevertheless maintain some limited functionality, such as monitoring calendar events relative to a system clock, monitoring an auxiliary display control that can be selected to turn on the auxiliary display, receiving and processing limited user input (e.g., through a touch screen or mechanical navigation inputs), maintaining a wireless communication connection, etc.

In one implementation, the auxiliary processing state executes a different operating system or a different operating system mode than the primary operating system mode. For example, while the primary processing state may execute a full-function operating system, such as MICROSOFT WINDOWS®, the auxiliary processing state may execute a limited or embedded operating system, such as a MICROSOFT WINDOWS® microkernel. Alternatively, the transition to an auxiliary processing state may switch the primary operating system into an auxiliary processing state (e.g., turning off or suspending various threads, reducing power consumption by the system, etc.).

In one implementation, the primary display device 102 is powered down (e.g., darkened) in auxiliary processing mode. However, responsive to a trigger, the auxiliary processing state can presents a user interface through an auxiliary display 100 via the primary display device 102, as shown in the right portion 112 and in the perspective view 114 of FIG. 1. Example triggers may include internal state changes (e.g., an email notification) or user interface actions (e.g., a user's activation of an auxiliary display control).

In the depicted implementation, the auxiliary display 100 occupies only a portion of the primary display device's area. By activating only a portion of the display backlight, for example, the rest of the display area remains dark, thereby conserving power. However, in alternative implementations, the auxiliary display 100 can occupy the entire area of the primary display device 102.

The example auxiliary display 100 presents a user interface of an auxiliary calendar application. In the illustrated auxiliary display 100, simple navigations controls are available in the touch screen interface for moving a selection cursor and activating a selection. For example, a user can navigate to a day in the month and select the day using the center point in the navigation control to change the display to a detailed view of the user's appointments that day. Alternative configurations may employ other control types, such as mechanical and/or electronic controls outside the display screen area. In particular, use of a touch screen display can allow user-selection of buttons and other controls directly within the display, as an alternative to providing explicit cursor controls.

Figure 2:
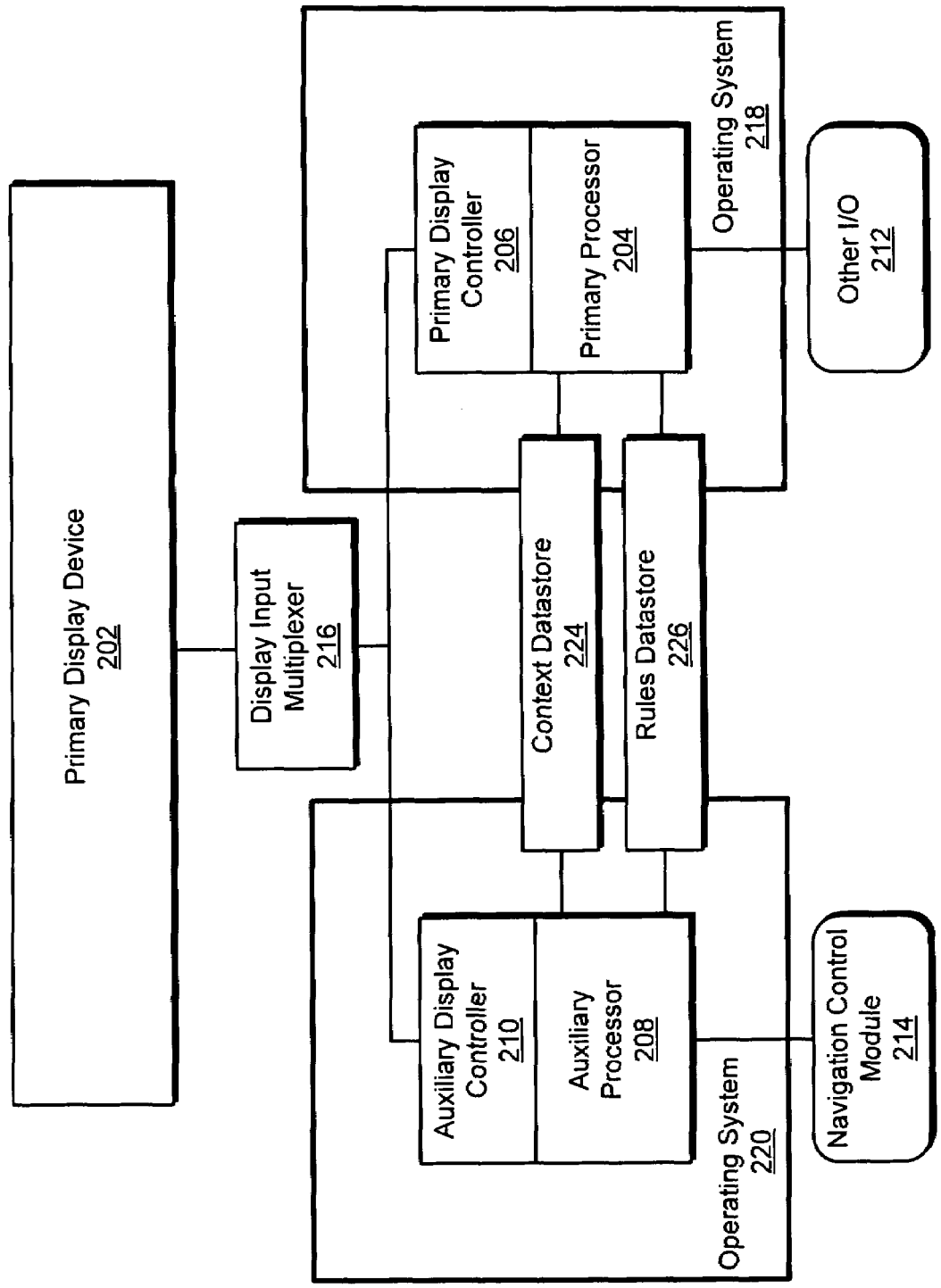
FIG. 2 illustrates an example architecture of a computing device supporting an auxiliary display within a primary display device.

FIG. 2 illustrates an example architecture of a computing device 200 supporting an auxiliary display within a primary display device 202. In a primary processing state, a primary processor 204 interfaces with a primary display controller 206 to signal the primary display device 202 to present the primary display. The primary processor 204 executes an operating system 218 and is coupled to Input/Output (I/O) components 212, such as a keyboard, a pointing device, serial ports, network adapters, etc. In an auxiliary processing state, an auxiliary processor 208 interfaces with auxiliary display controller 210 to signal the primary display device 202 to present the auxiliary display. The auxiliary processor 208 executes an operating system 220 and is coupled to a navigation control module 214, which may be integrated into a touch screen or implemented using some other navigational control components. It should be understood that the operating system 218 and the operating system 220 may be the same operating system, different instances of the same operating system, different modes of the same operating system, and different operating systems.

Generally, the primary processor 204 operates at a higher power consumption and level of functionality than the auxiliary processor 208. Other possible differences between the primary processor 204 and the auxiliary processor 208 may include without limitation: the processors execute different operating systems, the processors have access to different storage and I/O components, the processors are capable of executing different applications or different types of applications, etc.

In one implementation, a display input multiplexer 216 manages the signals from either the auxiliary display controller 210 or the primary display controller 206 to signal the primary display device 202. In an alternative implementation, the display input multiplexer 216 may be omitted (e.g., each display controller can present a high impedance interface to the primary display device 202 when the other display controller is active). In yet another implementation, the display input multiplexer 216 can signal the primary display device 202 to present the primary display in the primary display device 202 with the auxiliary display overlaid on top of the primary display (see e.g., FIGS. 6 and 7). The display input multiplexer 216 can also facilitate the transition between an auxiliary display and a primary display (e.g., by selectively passing display signals from either display controller to the primary display device 202).

In one implementation, context data pertaining to the operation of one or more auxiliary applications associated with the auxiliary display is stored in a context datastore 224 accessible by both the primary processor 204 and the auxiliary processor 208. For example, the coordinates of the auxiliary display region, the current date viewed in an auxiliary calendar application, a notification message in the auxiliary display, a currently viewed content page, an associated application, etc. can be stored by the auxiliary processor 208 in the auxiliary processing state and accessed by the primary processor 204 after a transition into the primary processing state, so as to maintain the context between the different states. It should also be understood that the context datastore 224 can store context information pertaining to a primary display, such that a transition from the primary display to an auxiliary display in an auxiliary processing state can be provided in a consistent manner.

In addition, in some implementations, various rules for triggering presentation of an auxiliary display in an auxiliary processing state may be configured in the device and stored in a rules datastore 226. For example, during an auxiliary processing state, the user may specify that he or she only wants an auxiliary display (possibly combined with an audible alert, etc.) to be presented when the user receives an email from a particular sender (e.g., a boss or a client). In another example, a rule can be established to trigger an auxiliary display for incoming VOIP calls, but not instant messenger messages. Such rules can be set up using a variety of methods, including selections in a configuration dialog box, Boolean expressions combining different kinds of events, policies set by the user or administrator, etc. The rules can be set or altered in either processing state, although most likely the settings would take place in primary processing state, where richer functionality is available.

In another implementation, rules can also be defined to trigger a transition from the auxiliary processing state to the primary processing state. For example, a user may set the device to wake-up at a certain time and transition into the primary processing state, generate and/or transmit a email (e.g., a system log), transition back into the auxiliary processing state thereafter. Likewise, the user may set the device to wake-up at a certain time and transition into the primary processing state and present a primary display (e.g., a user interface primary calendar application) for interaction by the user. Furthermore, other rules may be employed, such as rules specifying the conditions in which the device transitions from a primary processing state to an auxiliary processing state. The rules controlling these triggers can also be stored in the rules datastore 226.

Figure 3:
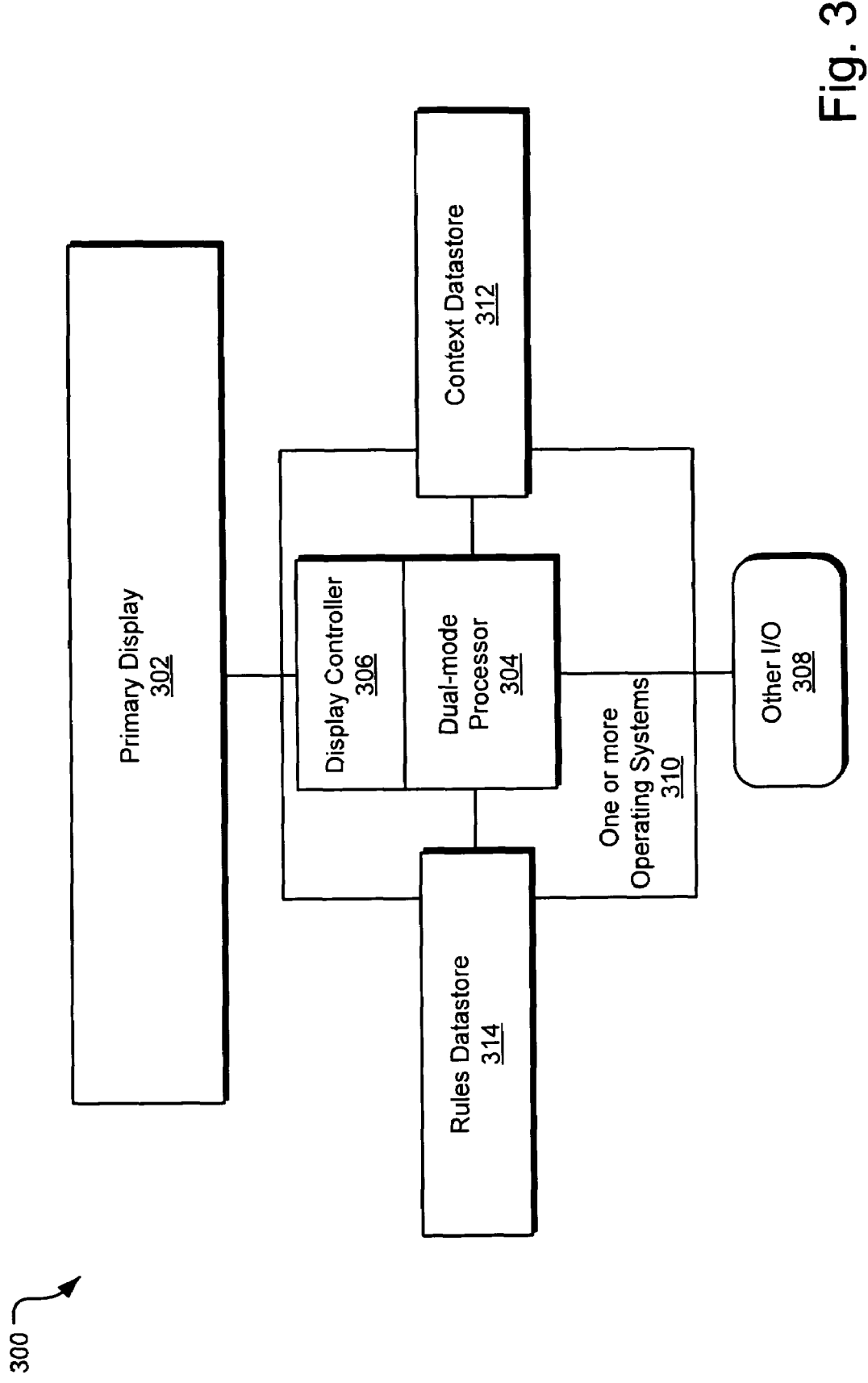
FIG. 3 illustrates another example architecture of a computing device supporting an auxiliary display within a primary display device.

FIG. 3 illustrates another example architecture of a computing device 300 supporting an auxiliary display within a primary display device 302. A dual-mode processor 304 interfaces with a display controller 306 to signal the primary display device 302 to present the primary display. The processor 304 executes one or more operating systems 310 in various states and is coupled to Input/Output (I/O) components 308, such as a keyboard, a pointing device, serial ports, network adapters, navigation controls, etc. In a primary processing state, the processor 304 is set to a primary mode of operation, which may include without limitation one or more of full power consumption, full functionality, a full operating system, full access to applications and storage, etc. In an auxiliary processing state, the processor 304 is set to an auxiliary mode of operation, which may include without limitation one or more of lower power consumption, limited functionality, execution of a different operating system, limited access to applications and storage, etc. It should be understood that the one or more operating systems 310 may be the same operating system, different instances of the same operating system, different modes of the same operating system, and different operating systems.

In one implementation, context data pertaining to the operation of one or more auxiliary applications associated with the auxiliary display is stored in a context data store 312 accessible by both the primary processor 304 in the auxiliary processing state and the primary processing state. For example, the coordinates of the auxiliary display region, the current date viewed in an auxiliary calendar application, a notification message in the auxiliary display, a currently viewed content page, an associated application, etc. can be stored by the primary processor 304 in the auxiliary processing state and accessed by the primary processor 304 after a transition into the primary processing state, so as to maintain the context between the different states. In another implementation, the display controller 306 can signal the primary display device 302 to present the primary display in the primary display device 202 with the auxiliary display overlaid on top of the primary display (see e.g., FIGS. 6 and 7).

It should also be understood that the context datastore 224 can store context information pertaining to a primary display, such that a transition from the primary display to an auxiliary display in an auxiliary processing state can be provided in a consistent manner.

It should be understood that certain rules may be stored in the rules datastore 314 to control triggers for presenting auxiliary displays while in an auxiliary processing state and/or to control triggers for transitioning from an auxiliary processing state to a primary processing state. Furthermore, other rules may be employed, such as rules specifying the conditions in which the device transitions from a primary processing state to an auxiliary processing state.

Figure 4:
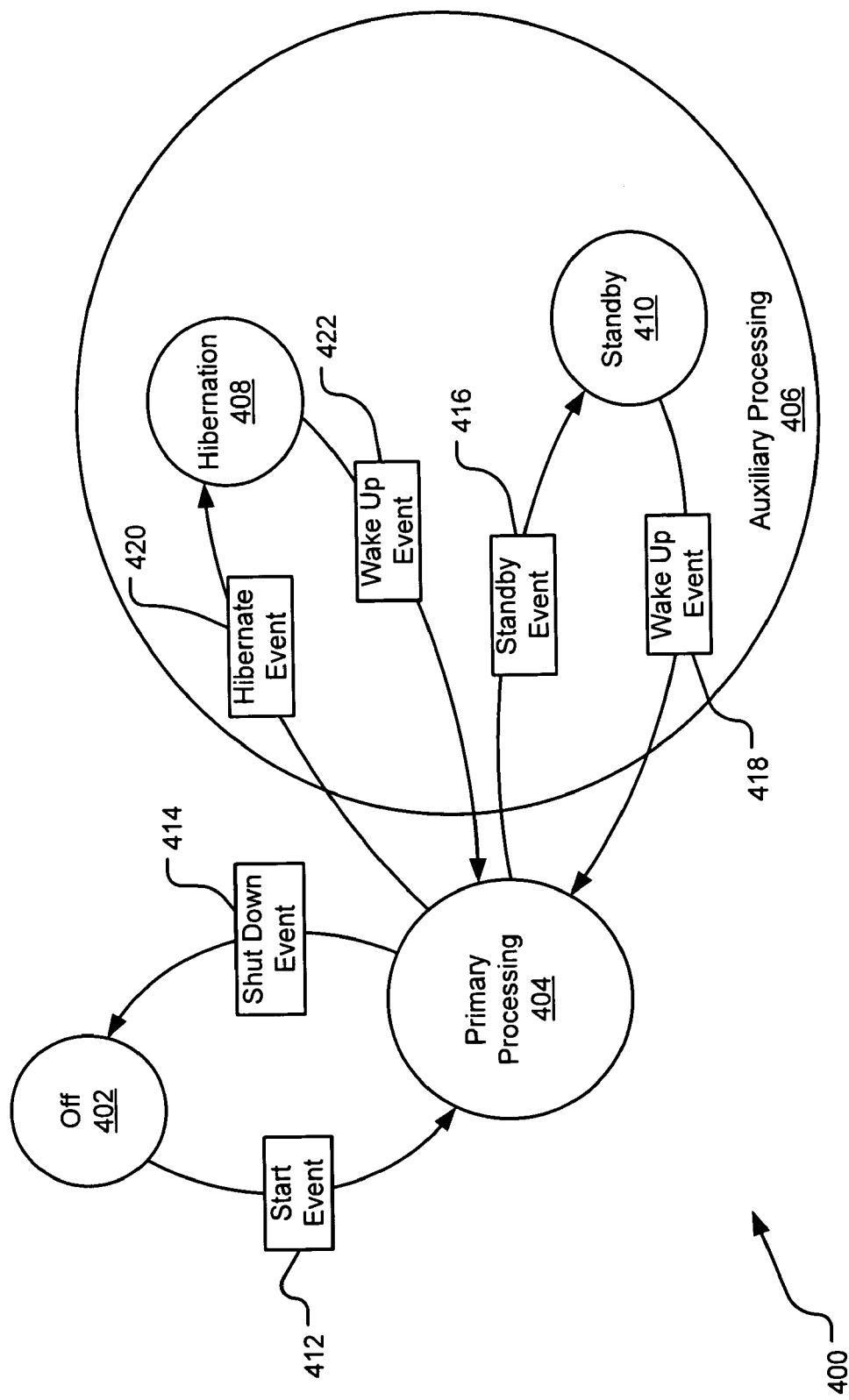
FIG. 4 illustrates example processing states relating to auxiliary and primary displays.

FIG. 4 illustrates example processing states 400 relating to auxiliary and primary displays. More particularly, the state diagram of FIG. 4 illustrates three main processing states: an off state 402, a primary processing state 404, and an auxiliary processing state 406. It should be understood that FIG. 4 can generally apply to different configurations of computing devices, including those described with regard to FIGS. 2 and 3. In the case of a device having both an auxiliary processor and a primary processor, the primary processor can dominate or completely take over processing in the primary processing state and the auxiliary processor can dominate or completely take over processing in the auxiliary processing state. Alternatively, in a device having a dual mode processor, the different processing states are generally controlled by different modes of the processor.

Additionally, the auxiliary processing state 406 includes two sub-states: a hibernation sub-state 408 and a standby sub-state 410. Before a computing device is powered on (or after the computing device is powered off), the system is in an off state 402. In some implementations, a primary display device associated with the computing device is off and is blank. In other implementations, it is possible that the primary display device is separately powered and therefore may remain "on" in some respect.

If a start event 412 occurs, the computing system transitions from the off state 402 to the primary processing state 404. An example of a start event 412 is when a user presses the power button on the computing system. This action powers up and boots the computing system into the primary processing state 404. The computing system is fully operational in the primary processing state 404, with the primary display device presenting a primary display within its display surface area. Accordingly, the computing system in the primary processing state 404 can manage its primary processor and any attached device components and is fully interactive with a user.

If, while the computing system is in the primary processing state 404, a shutdown event 414 occurs, the computing system transitions to the off state 402. In one implementation, the computing system performs a controlled shutdown operation, terminating processes and saving data in a controlled fashion prior to terminating power to the primary processor and other components. In an alternative implementation (e.g., a user holds down the power button for 5 seconds to abruptly terminate operation), power is merely terminated to the primary processor and other components in the computing system without managing a controlled shutdown operation.

If a standby event 416 occurs while the computing device is in the primary processing state 404, the computing device transitions to the standby sub-state 410 of the auxiliary processing state 406. In one implementation of the standby sub-state 410, the computing devices turns off the primary display device, spins down the hard-disk drive, and turns off other internal components (e.g., a CD-ROM drive, a DVD-ROM drive, a diskette drive, an external monitor connector, a keyboard, a parallel port; a serial port; a touch pad or other pointing device, etc.) so that the computing device consumes less battery power than in the primary processing state 404. In addition, the auxiliary processing state can involve other power saving measures as well, including, for example, selectively turning off other components (e.g., a wireless radio) in order to conserve power. The primary processor clock may also be slowed (e.g., auxiliary processing state of the primary processor) or processing may be switched to a separate, lower power processor (e.g., an auxiliary processor). The standby event 416 may be triggered by the user or by an internal action (e.g., expiration of a time, detection of another event, receipt of an external communication, etc.).

The standby sub-state 410 of the auxiliary processing state 406 is intended to allow a quick suspension into the auxiliary processing state 406 and a quick return to the primary processing state 404. As such, data is preserved in non-volatile memory or in volatile memory maintained by a limited amount of power from the computing device battery. Accordingly, the standby sub-state 410 of the auxiliary processing state 406 generally consumes more power than the hibernation sub-state 408 of the auxiliary processing state 406 at least partially because of the additional power maintaining the data in volatile memory, maintaining the processor operation, and/or powering other configuration features used to effect a quick suspension and restart.

If a wake up event 418 occurs while the computing device is in the standby sub-state 410, the primary processor is restarted or transitioned into the primary processing state 404 and other characteristics of primary processing state 404 are resumed (e.g., hard disk spins up, etc.).

In contrast, if a hibernate event 420 occurs while the computing device is in the primary processing state 404, the computing device transitions to the hibernation sub-state 408 of the auxiliary processing state 406. In one implementation of the hibernation sub-state 408, the computing devices turns off the primary display device, spins down the hard-disk drive, and turns off other internal components (e.g., a CD-ROM drive, a DVD-ROM drive, a diskette drive, an external monitor connector, a keyboard, a parallel port; a serial port; a touch pad or other pointing device, etc.) so that the computing device consumes less battery power than in the primary processing state 404. The primary processor clock may also be slowed (e.g., auxiliary processing state of the primary processor) or processing may be switched to a separate, lower power processor (e.g., an auxiliary processor). The hibernation event 420 may be triggered by the user or by an internal action (e.g., expiration of a time, detection of another event, receipt of an external communication, etc.).

The hibernation sub-state 408 of the auxiliary processing state 406 is intended to allow a robust suspension into the auxiliary processing state 406 and a robust return to the primary processing state 404. As such, data is preserved by writing an image of the current processor and memory states to a temporary file in a persistent data storage device (e.g., a hard drive). Accordingly, the hibernation sub-state 408 of the auxiliary processing state 406 generally consumes less power than the standby sub-state 410 of the auxiliary processing state 406. If a wake up event 422 occurs while the computing device is in the hibernation sub-state 408, the primary processor is restarted or transitioned into the primary processing state 404, other characteristics of primary processing state 404 are restarted (e.g., hard disk spins up, etc.), and the processor and memory states are reloaded from the temporary file.

Figure 5:
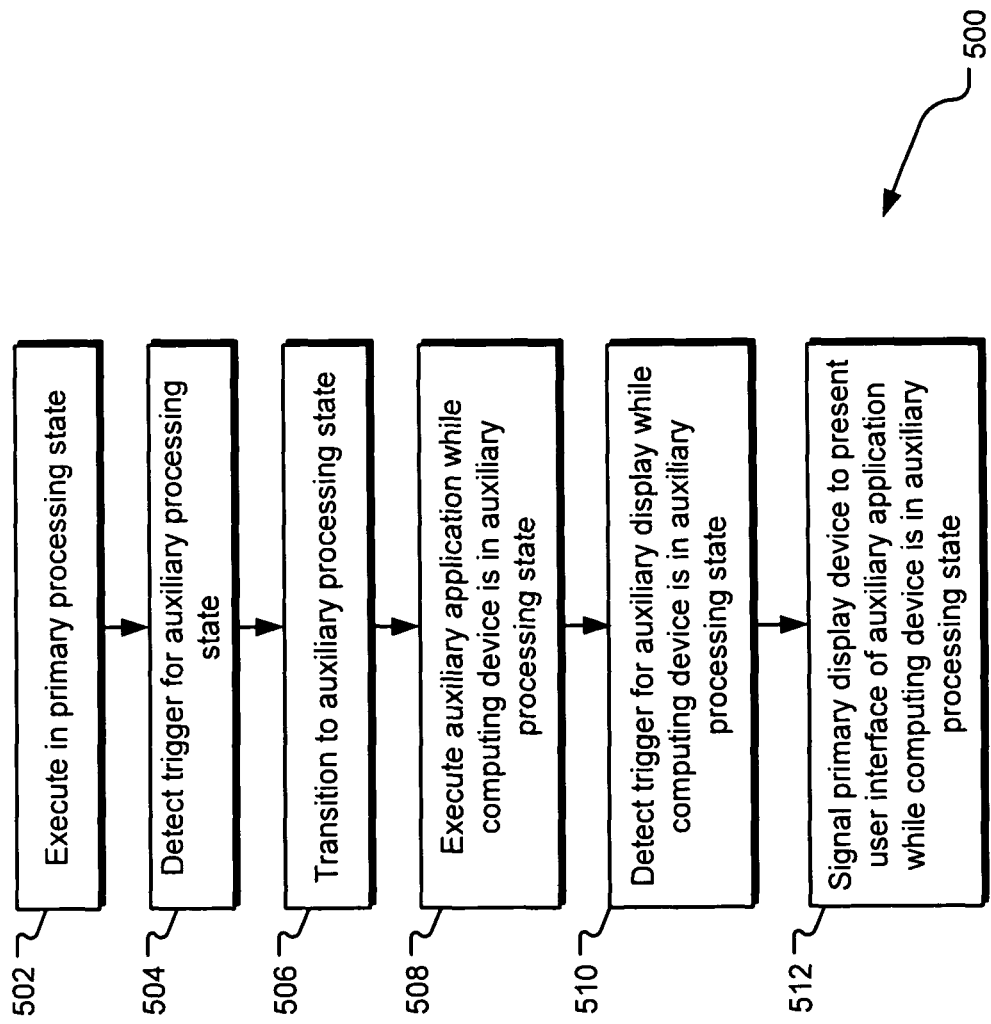
FIG. 5 illustrates example operations for switching between a primary display and an auxiliary display.

FIG. 5 illustrates example operations 500 for switching between a primary display and an auxiliary display. An execution operation 502 executes the computing device in a primary processing state. In one implementation, the computing device includes a processor having a primary processing mode and an auxiliary processing mode, wherein the auxiliary processing mode operates the processor at a lower power consumption that the primary processing mode. In another implementation, the computing device includes a primary processor and an auxiliary processor, wherein the auxiliary processor operates at lower power consumption than the primary processor. Other distinctions between primary processors/mode and auxiliary processors/modes are also contemplated.

A detection operation 504 detects a trigger for a auxiliary processing state. In one implementation, the trigger can be an internal action, such as an expiration of a timer, receipt of an external communication, etc. Alternatively, the trigger may take the form of a user action, such as a key stroke combination, another user interface action, closing a laptop, etc.

A transition operation 506 causes the computing device to transition from the primary processing state to the auxiliary processing state. In one implementation, this transition is accomplished by putting the computing device into a standby or hibernation sub -state. For example, the primary processor may shut down in favor of an auxiliary processor. Alternatively, the primary processor may transition into an auxiliary processing mode. An execution operation 508 executes an auxiliary application (e.g., an auxiliary calendar application, a telephony application, etc.) in the auxiliary processing state.

In one implementation, although the computing device is not entirely shut down, the primary display device initially shuts down or enters a low power consumption state in the auxiliary processing state. A triggering operation 510 detects a trigger for the auxiliary display, such as a user action (e.g., pressing a wake up control) or an internal action (e.g., issuance of a calendar notification, receipt of an external communication, etc.). As an example of the latter trigger condition, an internal action can detect an incoming VOIP call or email and therefore trigger presentation of the auxiliary display. The trigger causes an auxiliary display from the auxiliary application to be presented on the primary display device by causing a signaling operation 512 to send display signals originating from the auxiliary application to the primary display device.

In the auxiliary processing state, the primary display device initially shuts down the primary display before allowing the auxiliary display to be presented, although this intermediate shut down stage may be replaced by a smooth transition directly to the auxiliary display in some implementations. A display input multiplexer can facilitate the smooth transition by selectively passing the display signals from the appropriate display controllers during the transition.

Figure 6:
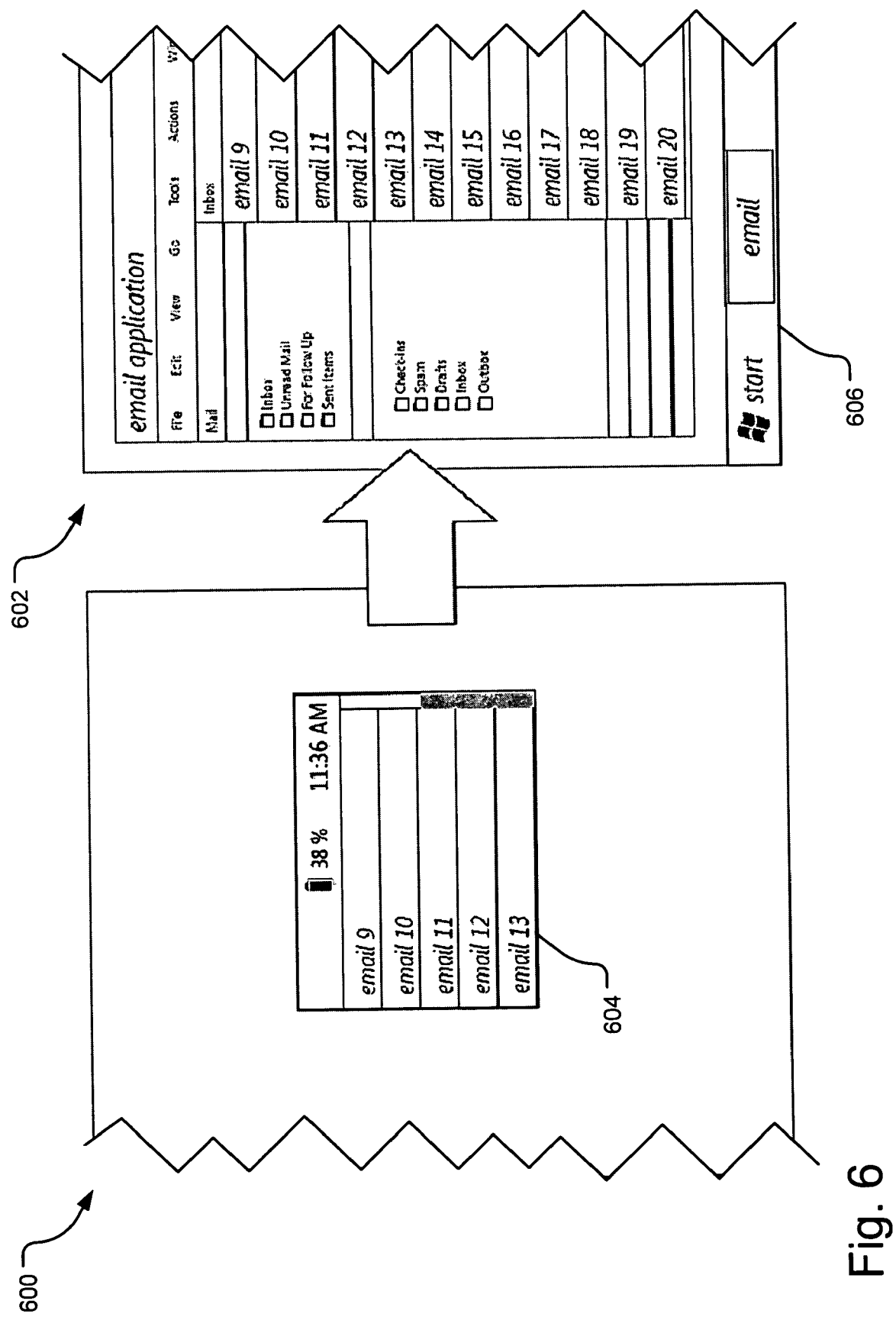
FIG. 6 illustrates a managed transition from an auxiliary display context to a primary display context.

FIG. 6 illustrates a managed transition from an auxiliary display context 600 to a primary display context 602. An auxiliary display 604 presents a list of emails scrolled to start with "email 9". Accordingly, when the primary display device transitions from the auxiliary display 604 to a primary display 606, context information saved during the auxiliary processing state is used in the primary processing state to synchronize the scrolling position of the email list view, such that the primary display 606 presents the list of emails scrolled to state with "email 9". In one implementation, for example, the auxiliary email application records the scrolling position in a context datastore and the counterpart primary email application reads the scrolling position from the context datastore and automatically scrolls the email list view to the appropriate email item. In this matter, the primary display 606 and the auxiliary display 604 provide some consistency of context for the user.

Figure 7:
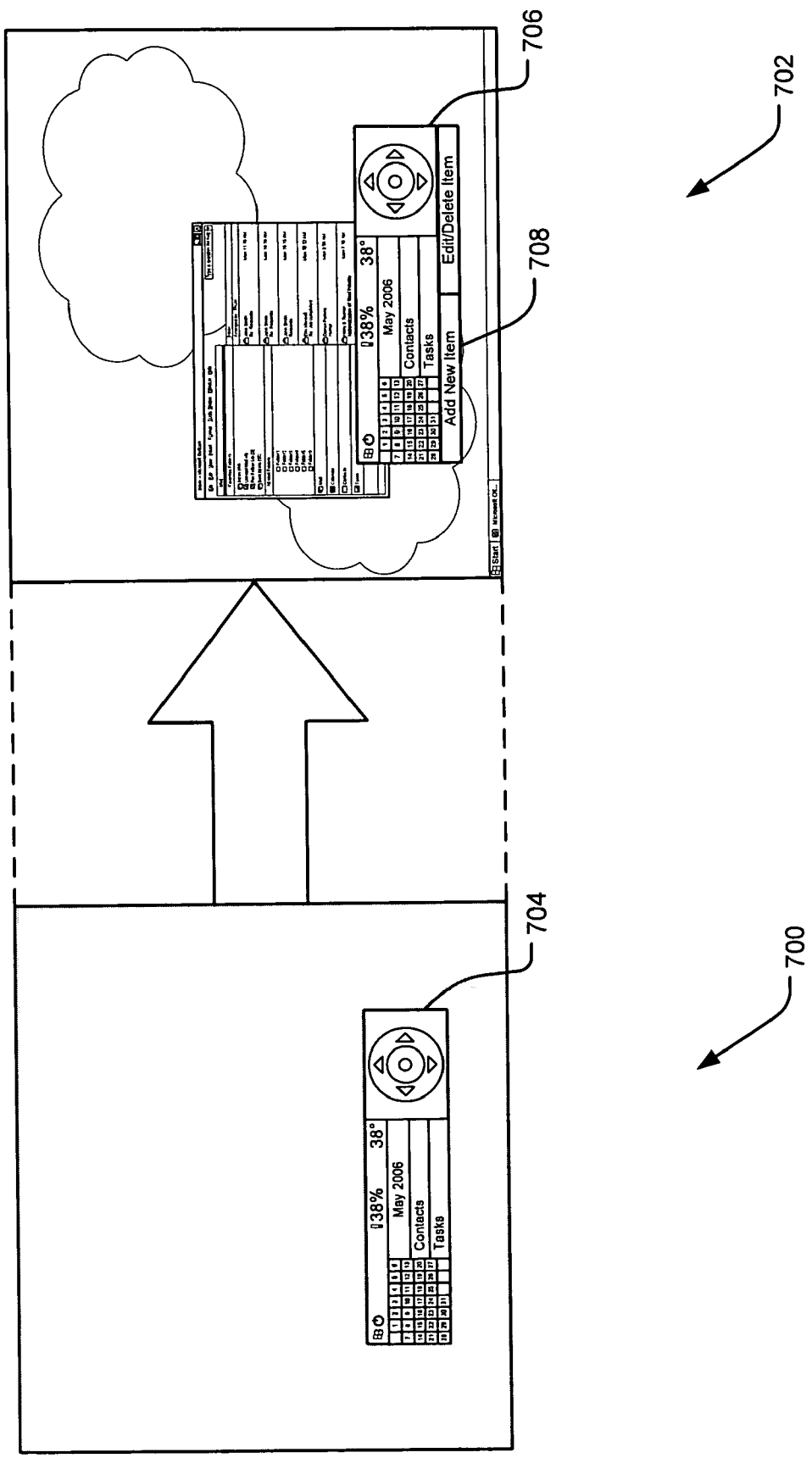
FIG. 7 illustrates another managed transition from an auxiliary display context to a primary display context.

FIG. 7 illustrates a managed transition from an auxiliary display context 700 to a primary display context 702. An auxiliary display 704 is presented in a primary display device of a computing device in an auxiliary processing state in the auxiliary display context 700. At some point in time, the computing device is triggered into a primary processing state. For example, the user is initially viewing the user interface of an auxiliary calendar application, which presents the auxiliary display in the primary display device. The user then selects a command (not shown) to transition the computing device into a primary processing state, perhaps in order to gain access to additional data or functionality (e.g., such as to view email data within an email client). As such, in the primary display context 702, a user interface 706 resembling the auxiliary display 704 is presented in the primary display device. It should also be understood that supplemental functionality may be added to the user interface 706 in the primary display context, such as illustrated by input controls 708 (e.g., the "Add New Item" control).

In order to provide a smooth transition between the auxiliary display and the primary display, the context of the auxiliary display is maintained when the primary display is presented. For example, a display consistent with the auxiliary display may be shown within the primary display, overlaying the components of the primary display. In this way, the user does not lose the data and functionality he or she was accessing in the auxiliary processing state. Furthermore, the presentation of the auxiliary display is maintained in the primary display. For example, the user interface from the auxiliary calendar program is displayed in substantially the same coordinates within the primary display device in the primary processing state as when the auxiliary display was presented in the auxiliary processing state.

It should be understood that the distinction between auxiliary applications and primary applications need not be made in all implementations. For example, auxiliary applications and primary applications may merely be different instances or modes of the same application or they may indeed be different and distinct applications.

In other implementations, the overlay of the user interface (e.g., on the primary display may be displayed at part of a screen saver, docked in or at a taskbar or sidebar, etc. In another implementation, the overlay of the user interface can morph into the user interface of the primary application over time.

Figure 8:
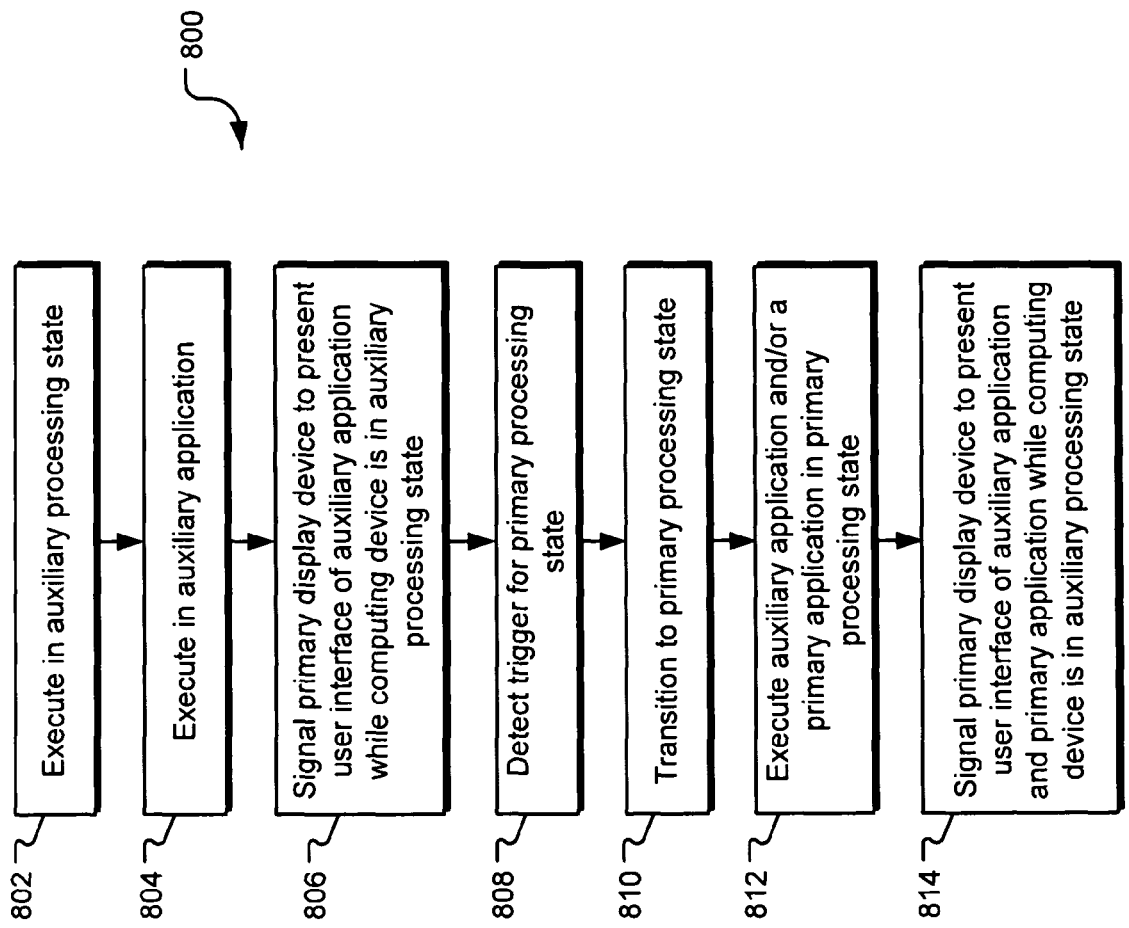
FIG. 8 illustrates example operations for switching between an auxiliary display and a primary display.

FIG. 8 illustrates example operations 800 for switching between an auxiliary display context and a primary display context. An execution operation 802 executes the computing device in an auxiliary processing state. In one implementation, the computing device includes a processor having a primary processing mode and an auxiliary processing mode, wherein the auxiliary processing mode operates the processor at lower power consumption than the primary processing mode. In another implementation, the computing device includes a primary processor and an auxiliary processor, wherein the auxiliary processor operates at a lower power consumption that the primary processor. Other distinctions between primary processors/mode and auxiliary processors/modes are also contemplated.

An execution operation 804 executes an auxiliary application (e.g., an auxiliary calendar application, a telephony application, etc.) in the auxiliary processing state. A signaling operation 806 sends display signals originating from the auxiliary application to be sent to the primary display device. In this state, at some point during operation, a triggering operation 808 detects a trigger for a transition to a primary processing state. For example, the user may instruct the computing system through the user interface of the auxiliary application to transition to the primary processing state. In response to this trigger, a transition operation 810 causes the computing device to transition from the auxiliary processing state to the primary processing state. In one implementation, this transition is accomplished by issuing a wake up event.

When the computing device has entered primary processing state, the auxiliary display is presented in the primary display device as an overlay over the primary display. In one implementation, an execution operation 812 executes both the auxiliary application and any primary applications concurrently. In this scenario, a signaling operation 814 displays the auxiliary application user interface and the primary application interface concurrently, with the auxiliary application window given the focus. Context data may be used to maintain consistency between the auxiliary display and the primary display so that the transition is not disruptive to the user. Alternatively, the execution operation 812 can execute a separate primary application (e.g., one compatible with the primary processor) that provides a similar user interface display as the auxiliary application, wherein the user interface of the similar primary application is given focus in the primary processing state by the signaling operation 814. It should also be understood that functionality associated with the auxiliary display may be supplemented (e.g., by additional controls, display components, etc.) in the primary processing state.

Figure 9:
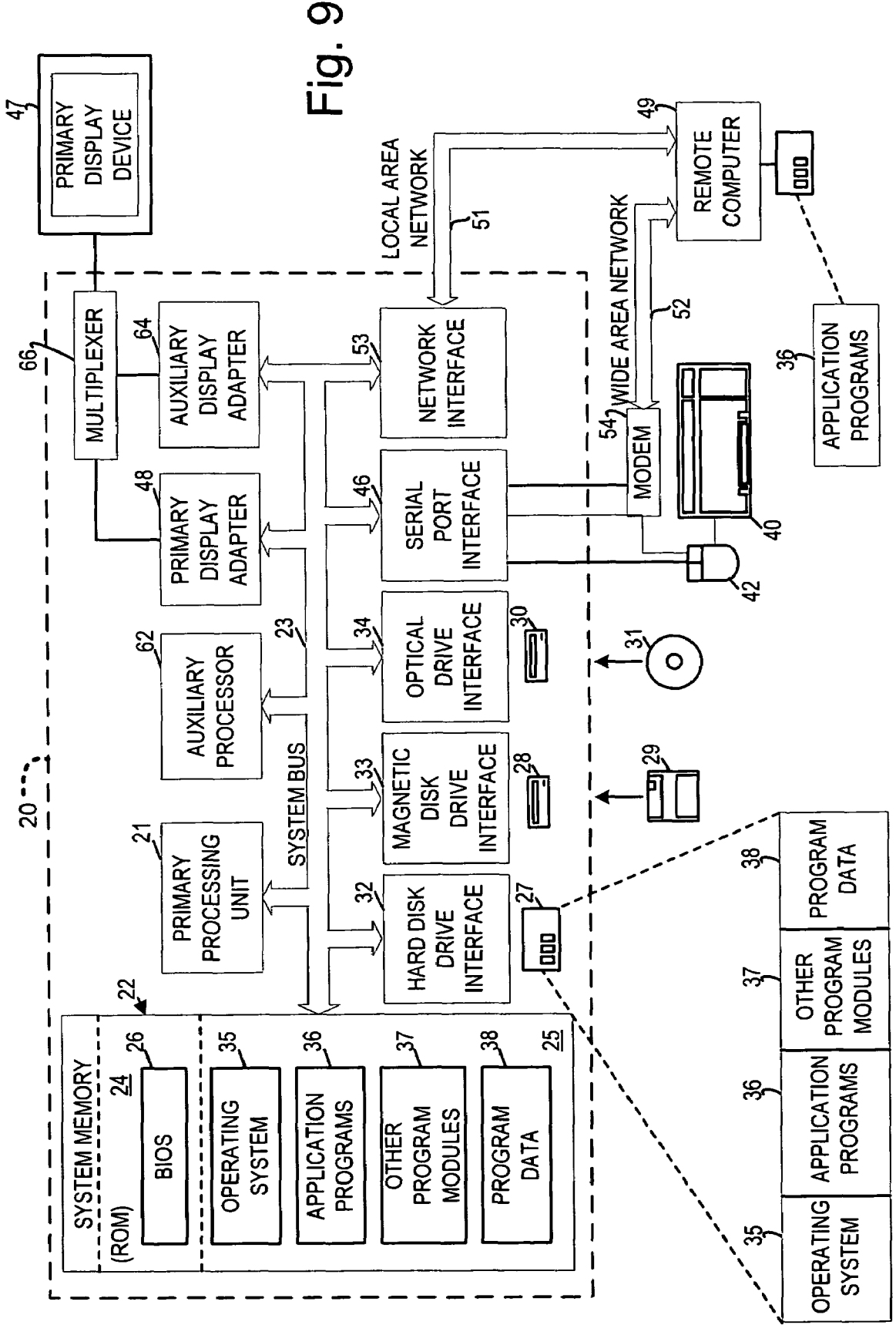
FIG. 9 illustrates an example system that may be useful in implementing the described technology.

The example hardware and operating environment of FIG. 9 for implementing the invention includes a general purpose computing device in the form of a gaming console or computer 20, including a processing unit 21, a system memory 22, and a system bus 23 that operatively couples various system components including the system memory to the processing unit 21. There may be only one or there may be more than one primary processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited. In the illustrated example, an auxiliary processor 48 is also coupled to the system bus 23 to provide processing operation for an auxiliary processing state. In an alternative implementation, the primary processing unit 21 provides both a primary processing mode and an auxiliary processing mode.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A primary display device 47, such as a flat panel display or other type of display device, is also connected to the system bus 23 via an display controller, such as a primary display adapter 48 or an auxiliary display adapter 64. In the illustrated example, a multiplexer 66 switches display signals from the individual display controllers. Alternatively, the display controllers can include components to provide a high impedance, such as tri-state buffers, when not signaling the primary display adapter 47. In an alternative implementation, a single display controller may be employed via the primary processing unit 21. In addition to the primary display device 47, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 9. The logical connections depicted in FIG. 9 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are example and other means of and communications devices for establishing a communications link between the computers may be used.

In an example implementation, an operating system, auxiliary applications, primary applications, and other modules may be embodied by instructions stored in memory 22 and/or storage devices 29 or 31 and processed by the processing unit 21. Auxiliary processing settings, primary processing settings, and other data may be stored in memory 22 and/or storage devices 29 or 31 as persistent datastores.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of example embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts described above. Rather, the specific features and acts described above are disclosed as example forms of implementing the claimed subject matter.

What is claimed is:

1. A computing system comprising:
  a primary display device;
  one or more processors configured to execute a primary
    application in a primary processing state and the primary application presents a primary display in the primary display device, wherein the one or more processors are further configured to execute an auxiliary application in an auxiliary processing state and the auxiliary application presents an auxiliary display in the primary display device, the one or more processors comprising a primary processor configured to execute the primary application and an auxiliary processor configured to execute the auxiliary application; and
- a display input multiplexer configured to receive display input signals controlled by the auxiliary processor and the primary processor, the display input multiplexer configured to selectively transmit the display input signals to the primary display device.

2. The computing system of claim 1 wherein the primary processor consumes more power in the primary processing state than the auxiliary processor consumes in the auxiliary processing state.

3. The computing system of claim 1 wherein at least one of the one or more processors executes the auxiliary application when the computing system is in a standby state.

4. The computing system of claim 1 wherein at least one of the one or more processors executes the auxiliary application when the computing system is in a hibernation state.

5. The computing system of claim 1 wherein the one or more processors includes a single processor having an auxiliary processing mode in which the auxiliary application is executed and a primary processing mode in which the primary application is executed.

6. The computing system of claim 1 wherein the one or more processors includes a single processor having an auxiliary processing mode in which the auxiliary application is executed and a primary processing mode in which the primary application is executed, and the auxiliary processing mode consumes less power than the primary processing mode.

7. The computing system of claim 1 further comprising:
- a context datastore that stores context data relating to the auxiliary display to allow consistency between the auxiliary display and the primary display.

8. The computing system of claim 1 further comprising:
- a rules datastore that stores rules controlling at least one of a triggering of the auxiliary display in the auxiliary processing state or a triggering of a transition from the auxiliary processing state to the primary processing state.

9. A method of presenting an auxiliary display in a primary display device of a computing device, the method comprising:
- transitioning the computing device from a primary processing state to an auxiliary processing state;
- detecting within the auxiliary processing state a trigger for presentation of the auxiliary display; and
- signaling the primary display device of the computing device to present the auxiliary display, responsive to detecting the trigger.

10. The method of claim 9 further comprising:
- executing an auxiliary application within the auxiliary processing state of the computing device, wherein the auxiliary application provides a user interface in the auxiliary display.

11. The method of claim 9 wherein a primary processor executes a primary application to display a primary display in the primary display device in the primary processing state and an auxiliary processor executes an auxiliary application to display the auxiliary display in the primary display device in the auxiliary processing state.

12. The method of claim 9 wherein a primary processor executes a primary application to display a primary display and an auxiliary processor executes an auxiliary application to display the auxiliary display, and the primary processor consumes more power in the primary processing state than the auxiliary processor consumes in the auxiliary processing state.

13. The method of claim 9 wherein the computing device is in a standby sub-state when in the auxiliary processing state.

14. The method of claim 9 wherein the computing device is in a hibernation sub-state when in the auxiliary processing state.

15. The method of claim 9 wherein the computing device includes a processor having an auxiliary processing mode in which an auxiliary application is executed in the auxiliary processing state and a primary processing mode in which a primary application is executed in the primary processing state.

16. The method of claim 9 wherein the computing device includes a processor having an auxiliary processing mode in which an auxiliary application is executed in the auxiliary processing state and a primary processing mode in which a primary application is executed in the primary processing state, and the auxiliary processing mode consumes less power than the primary processing mode.

17. A computer-readable storage medium having computer-executable instructions that when executed on a computer via a processor perform the method of claim 9.

18. A method of transitioning between an auxiliary display in a primary display device of a computing device and a primary display in the primary display device of the computing device, the method comprising:
- recording context data pertaining to the auxiliary display in an auxiliary processing state, wherein the auxiliary display includes a user interface of an auxiliary application;
- transitioning the computing device between the auxiliary processing state to a primary processing state;
- signaling the primary display device of the computing device to present the user interface of the auxiliary application in the primary display in accordance with the context data within the primary processing state.

19. A computer-readable storage medium having computer-executable instructions that when executed on a computer via a processor perform the method of claim 18.

* * * * *